Dec. 24, 1968     T. D. RANDOLPH     3,417,636

HEAT TRANSFER APPARATUS

Filed April 25, 1966     3 Sheets-Sheet 1

INVENTOR.
TROY DAWN RANDOLPH
BY
*Fishburn & Gold*
ATTORNEYS

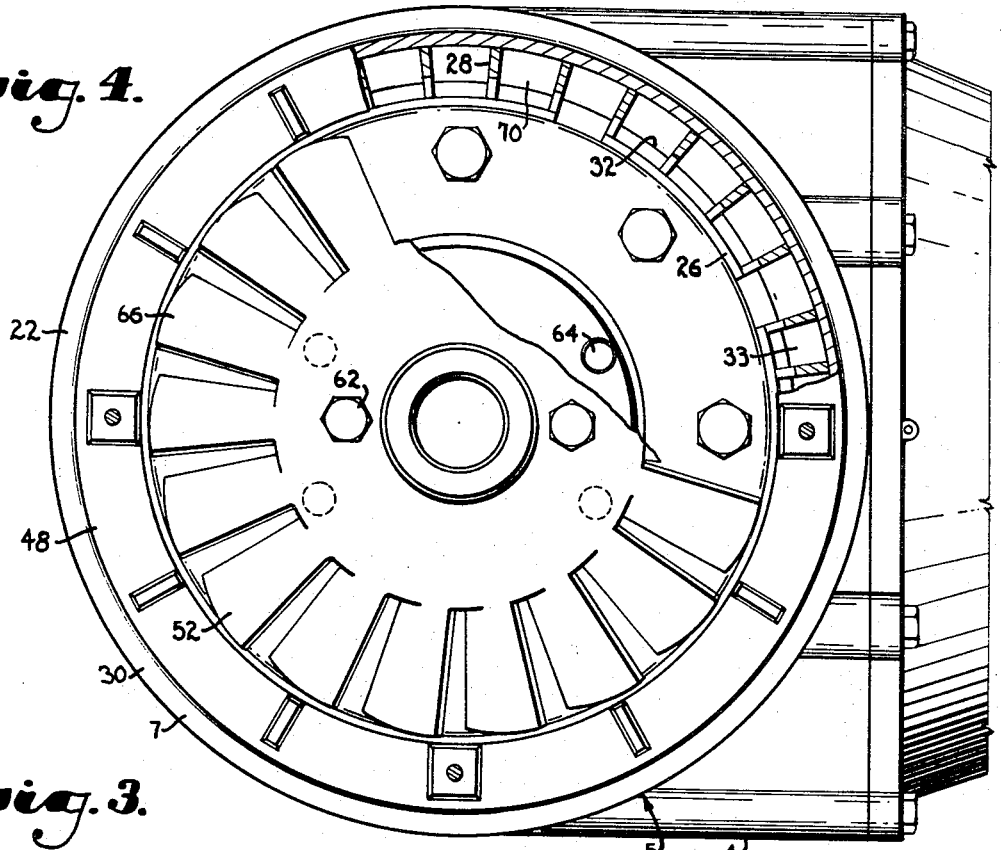
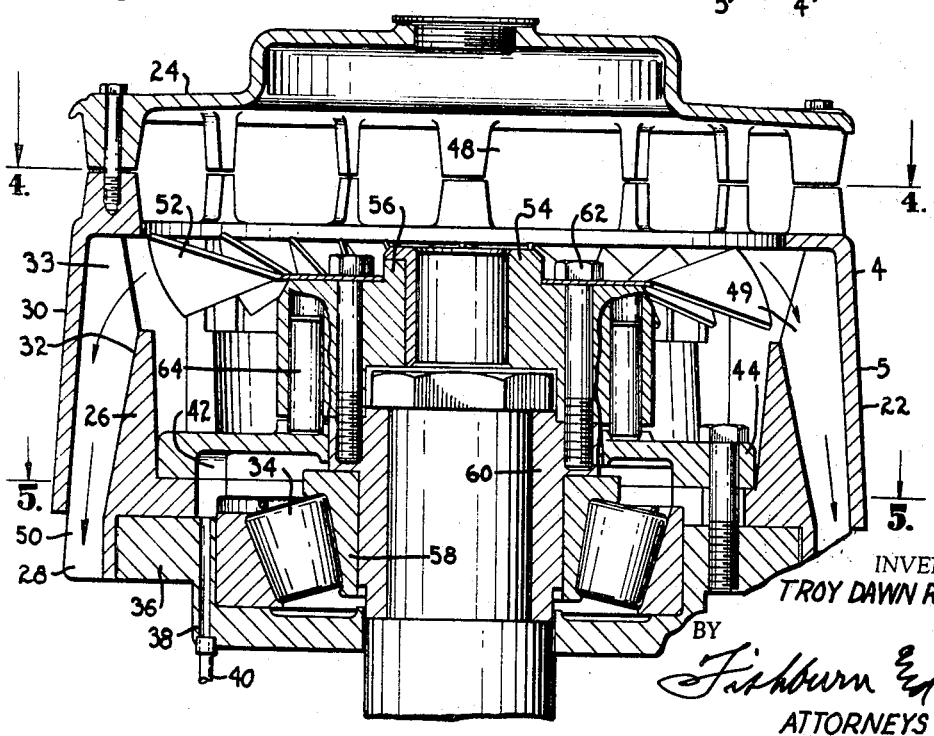

Dec. 24, 1968    T. D. RANDOLPH    3,417,636
HEAT TRANSFER APPARATUS

Filed April 25, 1966    3 Sheets-Sheet 3

INVENTOR.
TROY DAWN RANDOLPH
BY
Fishburn & Gold
ATTORNEYS

United States Patent Office 3,417,636
Patented Dec. 24, 1968

3,417,636
HEAT TRANSFER APPARATUS
Troy Dawn Randolph, Lubbock, Tex., assignor to Randolph Manufacturing Company, Lubbock, Tex., a corporation of Texas
Filed Apr. 25, 1966, Ser. No. 545,015
5 Claims. (Cl. 74—606)

ABSTRACT OF THE DISCLOSURE

This invention discloses a heat exchanger for a gear drive, particularly adapted for use in connection with deep well turbine pumps for irrigation and other industrial uses. It includes a vertical driven shaft with a carrier mounted within a housing and through which the shaft extends. The housing supports a bearing member and the heat exchanger surrounds the bearing member and also is in contact with the carrier. The carrier takes the thrust from the bearing member. The heat exchanger includes an inner wall with vertical fins or fins running parallel to the shaft, and also includes an outer wall spaced from the inner wall and fins are closely adjacent the outer wall to provide air passageways for movement of air therethrough, to dissipate the heat from the bearing. There is a fan mounted on the upper end of the shaft and a cover for the heat exchanger to prevent dust and dirt from entering the mechanism from the top. The lower portion of the housing includes a pump mechanism for pumping lubricant through tubes to the bearing member, and the oil is brought back to the housing through tubes after it has lubricated the bearing, if there is any excess left over. The oil does not aid in preventing the bearing from becoming hot except as a lubrication. The bearing is entirely air cooled otherwise. The reason is the oil does not contact the carrier below the bearing, so that there is no possibility of the oil cooling the bearing.

---

This invention relates to heat transfer systems, and more particularly to a new and improved heat transfer apparatus for use in drive systems.

Heretofore, considerable difficulty has been experienced in the art of drive systems and providing adequate cooling means for bearings, particularly thrust bearings in such apparatus as a right angle pump drive. A pump drive of this nature may be employed in deep well pumping operations to drive turbine pumps thereby imposing considerable thrust loading on the thrust bearings of the apparatus resulting in excessive heating of said bearings. The prior art devices have provided various means for cooling thrust bearings of this nature. However, these means normally utilize separate cooling systems operating independently of the drive system, said cooling systems requiring separate connections upon installation to place the cooling system in operable condition. Experience has indicated that such cooling systems are insufficient as those purchasing, installing or utilizing drive systems of this nature consistently fail to connect, properly install or properly maintain the separate cooling systems ultimately resulting in over-heating of the drive system and failure of said system.

The principal objects of this invention are to alleviate the aforementioned difficulties in the art by providing a drive system employing a new and improved heat transfer apparatus directly connected to said drive system and operable in connection with said drive system; to provide such an apparatus which will eliminate the necessity of separate cooling systems in relation to drive systems, thereby materially affecting the reliability of such drive systems; to provide such an apparatus for utilization on a right angle pump drive system for cooling the bearings within said system, said apparatus being operable by the rotation of the driven shafts to insure heat transfer from the bearings during operation of the drive system; to provide such an apparatus which eliminates the necessity of heat transfer systems employing coolants and the like, thereby reducing operating and maintenance expenses; to provide such an apparatus including a new and novel housing construction for effective heat transfer from said housing into the surrounding atmosphere; to provide such an apparatus of simple construction effectively reducing both manufacturing and installation costs of drive systems of the nature described.

This invention contemplates a heat transfer apparatus for utilization in association with a drive system, said apparatus including a housing about said system, said housing defining a plurality of air flow passageways, a drive shaft rotatably retained within said housing in a bearing assembly, means in association with said bearing assembly and in communication with the air flow passageways through said housing of high heat conduction characteristics for conducting heat from said bearings to said passageways. The invention also contemplates the employment of a fan means operatively mounted to said drive shaft having air movement means in communication with said air flow passageways to continuously move air through said housing and over said heat conduction means throughout the operation of said drive shaft. The use of the fan means may be omitted in certain situations where the generation of heat is low or other factors so dictate and the natural tendency of the air to flow through the passageways utilized to remove the heat.

This invention further contemplates that the heat conduction means includes a plurality of radiating fins, said fins having their surfaces in communication with the air flow passageways so as to transfer quantities of heat from said fins and into the moving air within said air flow passageways. The invention also contemplates the employment of one or more of such heat transfer apparatus in a given drive system, each of the said apparatus being operable to effectively transfer the heat from one or more bearing assemblies into the surrounding atmosphere through heat conducting means. The heat conducting means of this invention may include lubricating fluids, specifically designed heat conducting members including radiating fins.

Other objects and advantages of this invention will become apparent from the following description taken in connection with the accompanying drawings wherein are set forth by way of illustration and example certain embodiments of this invention.

FIGURE 3 is a vertical sectional view through the bonnet and housing of the right angle pump drive shown in FIGURE 1 illustrating the heat transfer apparatus in its assembled relation to the thrust bearing assembly of the vertical shaft of the right angle pump drive.

FIGURE 4 is a horizontal sectional view taken on line 4—4, FIGURE 3, showing the fan means or air movement means in plan view with a portion broken away to illustrate the air flow passageways through the housing structure.

Figure 1:
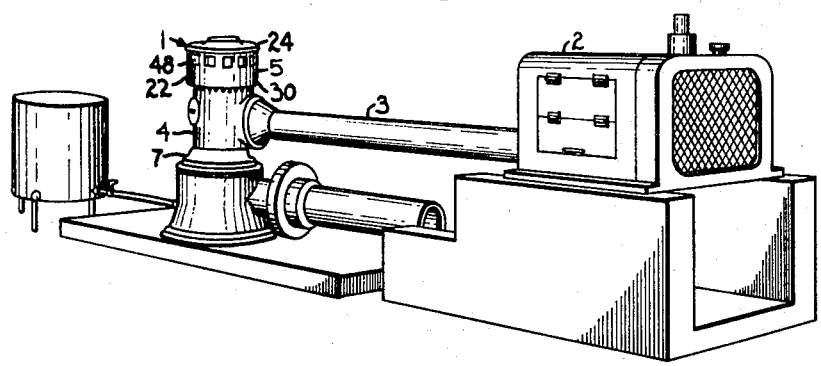
FIGURE 1 is a perspective view of a deep well pumping operation illustrating a drive system in connection with a prime mover for operating a turbine pump, said drive system being a right angle pump drive having a heat transfer apparatus embodying the features of this invention.
Figure 2:
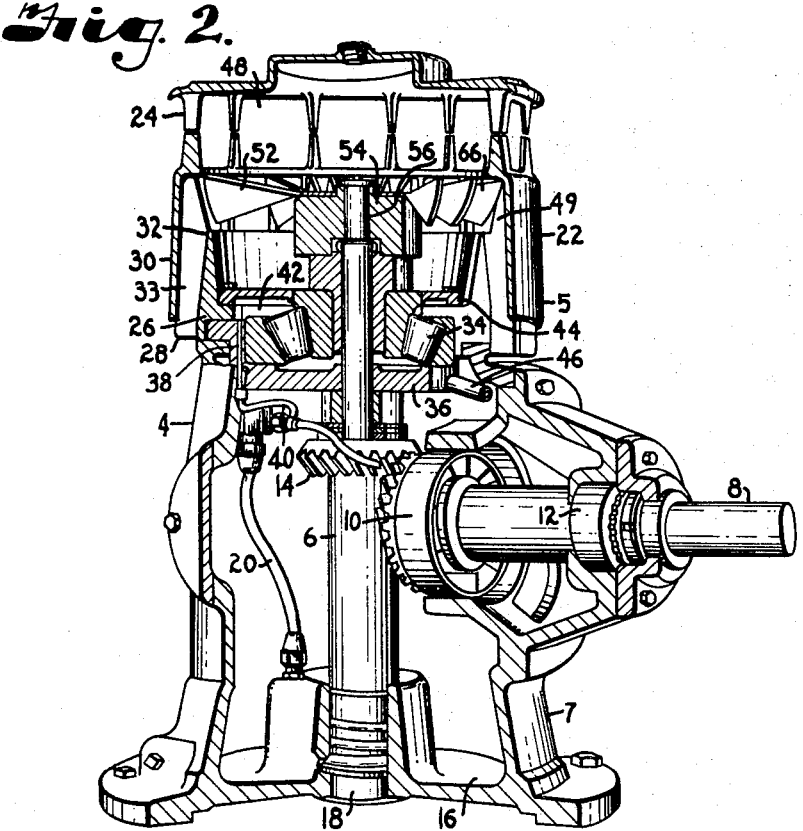
FIGURE 2 is a perspective view of the right angle pump drive shown in FIGURE 1, having a portion of the housing broken away to illustrate the drive system and the heat transfer apparatus embodying the features of this invention.
Figure 5:
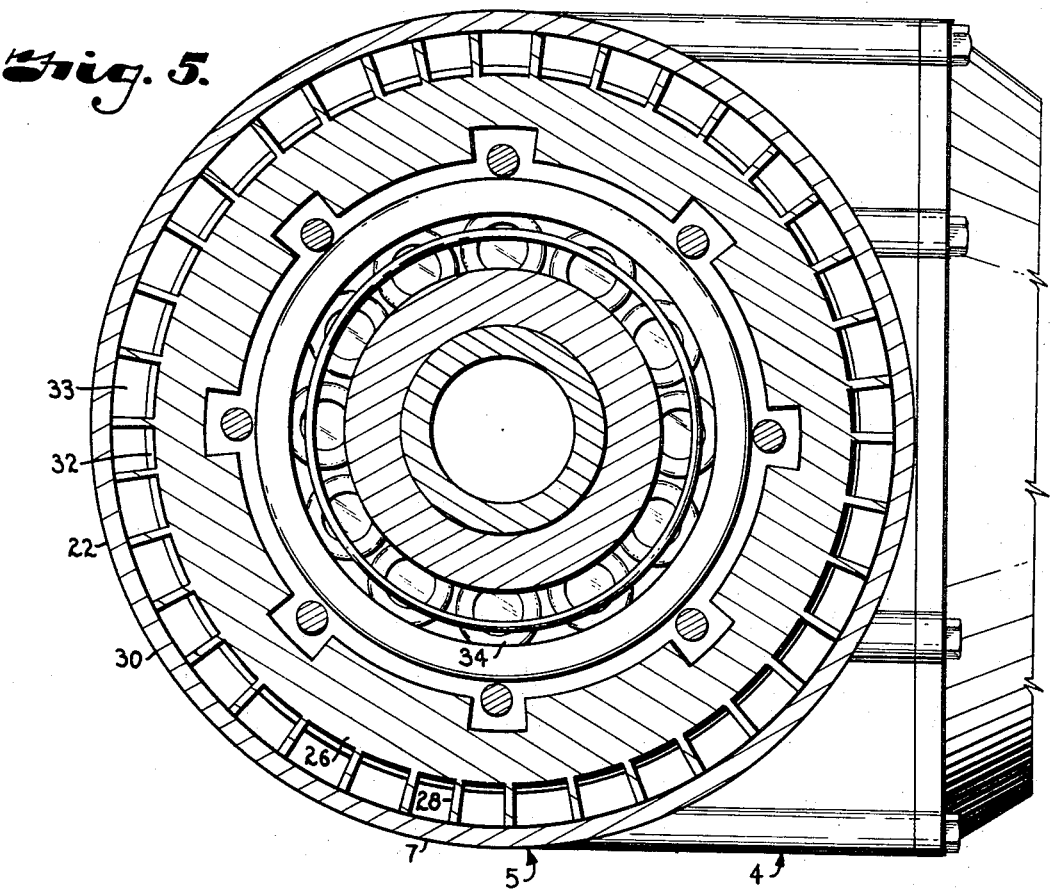
FIGURE 5 is a horizontal sectional view taken on line 5—5, FIGURE 3, illustrating the assembled relation of the thrust bearing assembly, heat conduction member and air flow passageways through said housing.

Referring to the drawings in more detail.

The reference numeral 1 generally designates a deep well pumping system, the above ground portion of which is shown in FIGURE 1, said system 1 including an engine or prime mover 2, a drive system 3, including a right angle pump drive 4 for driving a turbine pump in the deep well. The deep well pumping system 1 is exemplary only as it is illustrative of a type of system in which a heat transfer apparatus embodying the features of this invention may be employed to effectively transfer heat from a bearing assembly into the surrounding atmosphere, to maintain the system within the proper operating temperature range. It should be noted that the heat transfer apparatus embodying the features of this invention may be utilized on other and different systems, however the heat transfer apparatus has been found to be particularly advantageous in effecting the transfer of heat from the thrust bearing assembly and the other assemblies of a right angle pump drive apparatus.

The heating transfer apparatus embodying the features of this invention is illustrated herein in relation to the right angle pump drive apparatus 4 and is broadly designated by the reference numeral 5. The heat transfer apparatus 5, as illustrated, is operatively connected to a vertical or upright drive shaft 6 which is, in turn, mounted within a housing 7 in a conventional manner. The upright or vertical shaft 6 is operatively driven by means of a horizontal shaft 8 supported on bearing assemblies 10 and 12 and imparting a rotational driving motion to the upright shaft 6 by means of a spiral bevel gear 14 in a conventional manner. The housing 7 is completely sealed defining an inner chamber or reservoir 16 for retaining a lubricating fluid therein for the lubrication of the various beaings within the right angle drive apparatus 4. A pumping mechanism 18 is housed in the lower portion of the oil reservoir 16 and operates in a conventional manner to pump the lubricating oil or fluid through a distribution system 20 in a conventional manner to the various critical friction areas within the apparatus 4.

The heat transfer apparatus 5 in the illustrated embodiment includes a heat exchanger 22 formed as a portion of a bonnet structure 24 of housing 7, said bonnet structure 24 being operatively mounted on the reservoir defining portion 26 of housing 7 by suitable means. The heat exchanger 22 is comprised of a heat conducting member 26, said member 26 being illustrated herein as an annular member having a plurality of outwardly extending fins or radiators 28 disposed in a circumferentially spaced relation about the annular heat conducting member 26 with the fins 28 being bounded on their exterior edge by a circumferentially extending wall portion or exterior wall portion 30 formed in the illustrated embodiment integrally with the fin 28. The heat conduction member 26 also includes an inner wall 32 extending circumferentially about the annular conducting member 26 at the interior edge of the fins 28 and integral with said fins 28.

The fins 28, exterior wall 30 and the interior wall 32 define a plurality of air flow passageways 33 through the bonnet portion 24 of housing 7 through which air flow may be induced to effort a flow of air into said bonnet portion 24 and to expel air from portion 24 in order to transfer heat from the heat conduction member 26 to the exterior atmosphere of the right angle drive apparatus 4 or the natural flow of air through said passageways may be utilized to remove the heat. The heat conduction member 26 is formed of a high conduction metal as for instance aluminum in order to effectively transfer the heat generated by the thrust bearing assembly 34 which serves to rotatably retain the drive shaft 6 in the proper position within housing 7. The other components around the bearing assembly 34 which cooperate with said member 26 in removing heat from said assembly 34 may be made of similar materials to increase the rate of heat transfer.

The thrust bearing assembly 34, as illustrated, is supported within housing 7 by means of a thrust bearing carrier 36 suitably mounted to the oil reservoir defining portion 26 of the housing 7, said carrier 36 being in underlying contacting relation to the heat conduction member 26 inwardly of the air flow passageways 28 and the inner wall 32. The thrust bearing carrier 36 defines an opening 38 through which an oil distribution tube 40 may extend to supply oil or other lubricating fluids to the thrust bearings 34, said tube 40 being operatively connected in the distribution system 20. The lubricating fluid is provided to a lubricating chamber 42 defined by the carrier 36, thrust bearing 34, heat conduction member 26 and a non-reversed ratchet ring 44. The lubricating fluid supplied to the lubricating chamber 42 passes through the thrust bearing assembly 34 and is discharged through a passageway defined by a tube 46 for lubrication of the bearings 10 and 12 rotatably retaining the horizontal driving shaft 8 in the housing 7.

The heat generated from the frictional engagement in the thrust bearing assembly 34, in addition to being transferred to the thrust bearing carrier 36, ratchet ring 44 and the heat conduction member 26, will be transferred to the lubicating medium which will, in turn, conduct or transfer the heat to carrier 36, ring 44 and member 26 in such a manner that the heat may be conducted by the heat conduction member 26 to the air flow passageways 33 for transfer to the moving air through said passageways 33 for dissipation of the heat into the surrounding atmosphere about the right angle drive apparatus 4. It should be noted that both the carrier 36 and the ring 44 are in contacting relation to the heat conduction member 26 in such a manner that a through heat conducting path is formed from the thrust bearing assembly 34 through its surrounding components to the air flow passageways 33.

The heat transfer apparatus 5, as illustrated, includes a means for inducing a flow of air through the air flow passageways 33 in such a manner as to pull air at the ambient temperature through a plurality of apertures 48 in the bonnet portion 24 of the housing 7, to drive said air downwardly through the inlet end portion 49 of through passageways 33 and expel the air outwardly from the heat exchanger 22 through a plurality of openings or outlet portions 50 of passageways 33, said openings 50 being disposed circumferentially about the housing 7 at the base of each of the plurality of air flow passages 33. In this manner the air may be rapidly moved through the passageways 33, the heat transferred from the heat conduction member 26 to the air and the air expelled to the surrounding atmosphere for dissipation of the heat.

The means for inducing the flow of air through the air flow passageways 33 is illustrated herein as a fan 52 which is operatively mounted to a non-reverse clutch 54 secured to the upper end portion 56 of the vertical or upright shaft 6. The upright shaft 6 is supported within the housing 7 in a conventional manner by the thrust bearing assembly 34 by securing the inner race 58 of the thrust bearing assembly 34 to a drive block and bushing 60 with the non-reverse clutch 54 connected in a conventional manner to the drive block and bushing 60 by means of a pair of bolts 62 which are also employed to retain the fan 52 in overlying contacting relation to the non-reverse clutch 54. The non-reverse clutch 54 being operable in a conventional manner and having a plurality of non-reverse pins 64 in cooperating engagement with the non-reverse ratchet ring 44 to insure the movement of the upright shaft 6 in a single predetermined direction.

The fan 52, as illustrated, is secured to clutch 54 by bolts 62 and has a plurality of outwardly extending, circumferentially disposed air movement means, illustrated as blade portions 66, positioned between the apertures 48 in the bonnet portion 26 of housing 7 and the flow passages 33 with said blades 66 being disposed at a suitable angle for pulling air from the surrounding atmosphere through the apertures 48 and directing said air flow downwardly through the flow passages 33 for the transfer of heat from the heat conduction member 26. As the fan 52 is operatively mounted to the non-reverse clutch 54 which rotates with the rotation of the vertical driving shaft 6, the heat transfer apparatus 5 is operable to transfer heat from the thrust bearings 34 and the lubricating oil to the surrounding atmosphere at any time the drive system 3 is activated without the necessity of a separate connection and installation of a cooling system or the maintenance thereof.

Figure 6:
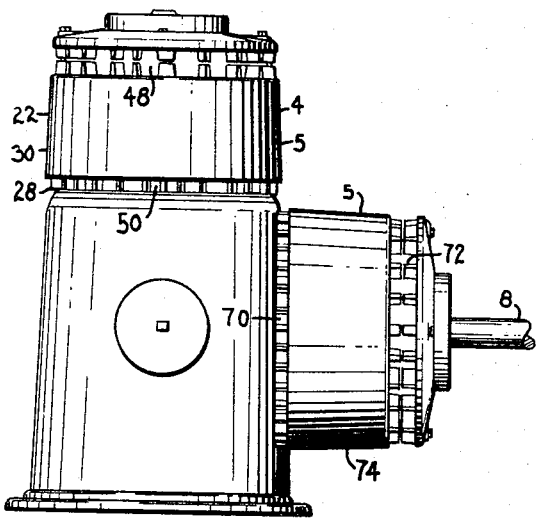
FIGURE 6 is a perspective view of a right angle drive system illustrating the utilization of the heat transfer apparatus embodying the features of this invention on both the horizontal and vertical shafts of the right angle drive system.

A single heat transfer apparatus may be employed to cool or effect heat transfer from all the working parts of most right angle drive systems. The entire right angle drive apparatus 4 is maintained at the proper operating temperature by the extraction or transfer of heat from the lubricating fluid and conduction of the heat to the air flow passageways 33. As the lubricating fluid circulates within the housing 7 of the apparatus 4, the various working parts of the drive system 3, such as the spiral bevel gear 14 and the bearings 10 and 12 of the horizontal shaft 8, transfer heat to the lubricating fluid, which, in turn, upon passage of the lubricating fluid into the chamber 42 of the thrust bearing assembly 34 transfers said heat to the heat conduction member 26 for transfer of the heat to the air moving through the air flow passage 33. However, if in some instances it is desirable to provide a second heat transfer apparatus 5 on a drive system such as a right angle drive system, such may be accomplished by connecting the heat transfer apparatus 5 in relation to the horizontal shaft 8 in such a manner as to provide a heat conduction path from the bearings 10 and 12 to a plurality of flow passageways indicated by the numeral 70 in FIGURE 6 which cooperate with the apertures 72 in the bonnet 74 for the movement of air through passageways 70 as induced by a fan mechanism such as that shown in FIGURE 3 and represented by the numeral 52 or by a natural tendency of the air to flow through said passageways.

In operation, the horizontal shaft 8 is rotatably driven to drive the spiral bevel gear 14 to thereby impart a rotational movement to the vertical shaft 6 in such a manner as to drive a mechanism such as a turbine pump assembly operatively connected to shaft 6. As the vertical shaft 6 rotates within the housing 7, the drive block and bushing 60 and inner race 58 rotate developing a frictional heat within the thrust bearing assembly 34 which must be transferred from the bearing assembly 34 in order to insure the continued satisfactory operation of the drive system 3. In the illustrated embodiment, as the vertical or upright shaft 6 rotates, a non-reverse clutch 54 operatively mounted to the upper end portion 56 of the vertical shaft 6 rotates in relation to the rotation of the shaft 6 moving a fan mechanism 52 to pull air through a plurality of apertures 48 disposed circumferentially about the bonnet portion 26 of the housing 7 and directs said air through a plurality of air flow passageways 33 disposed circumferentially about the bonnet portion 26 of the housing 7 within the heat exchange member 22 in order to effect a heat transfer from the thrust bearing 34 and the lubricating fluid associated therewith to the air moving through the flow passageways 33 for dissipation of the heat within the surrounding atmosphere. Were the fan 52 omitted, the buildup of heat in the passageways 33 through the conduction thereto by member 26 would induce a natural flow of air through passageway 33 for heat removal.

The heat generated within the thrust bearing assembly 34 and the remainder of the working components within the right angle drive mechanism 4, such as the spiral bevel gear 14 and the bearings 10 and 12, is transferred through the lubricating medium, the thrust bearing carrier 36 and the ratchet ring 44 to a heat conduction member 26, thereby providing a through heat conduction path from the thrust bearing assembly 34 and the lubricating fluid to the flow passages 33. The heat conduction member 26 contains a plurality of passageway defining fins 28 which serve as radiators along with the side walls 30 and 32 in order to provide an extensive surface area in contact with the moving air for transfer of the heat conducted through the heat conduction member 26 into the air of the surrounding atmosphere.

By the utilization of this apparatus, both the manufacturer and the consumer may be assured of a consistent heat transfer from the working parts of the drive system during system operation without the necessity of reliance upon proper installation and maintenance of a separate cooling system. The consumer may also enjoy a relatively maintenance-free cooling system thereby eliminating the maintenance problems normally attendant the prior art devices. This point is especially important in the utilization of a cooling system of this type, embodying the features of this invention, used in relation to deep well pumping operation where the pumping operation may continue for long periods of time unattended and where failure of cooling systems in the prior art devices in such unattended installations results in partial or complete failure of the drive system, thereby requiring expensive repairs and replacement of parts.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A bevel gear drive apparatus including:
   (a) a housing,
   (b) a driven shaft extending vertically through said housing,
   (c) a thrust bearing assembly rotatably retaining said driven shaft in said housing, said thrust bearing assembly being subject to a heavy load and thereby a major heat producing structure,
   (d) heat exchanger means on said housing defining air flow passageways through said housing, said passageways having exteriorly communicating end portions, said heat exchanger means including means for providing a heat conduction path to said air flow passageways from said thrust bearing assembly,
   (e) fan means operatively mounted on said driven shaft adjacent said heavily loaded bearing having air movement means in communication with said air flow passageways to continuously move air through said heat exchanger means and over said heat conduction path, said driven shaft being disposed in an upright manner and rotatably retained within said housing by said thrust bearing assembly,
   (f) said apparatus including a horizontal shaft, a plurality of bearing assemblies, said bearing assemblies rotatably retaining said horizontal shaft within said housing, said horizontal shaft being operatively connected to said vertical shaft,
   (g) a lubricating fluid circulation system, said circulation system including means for circulating said fluid within said housing over the thrust bearing assembly of said upright shaft and the bearing assemblies of said horizontal shaft, such that heat transfer from the bearing assemblies of said horizontal shaft may be, in turn, transferred to the heat conduction means in contact with the thrust bearing assembly of the upright shaft to effectively remove heat from the entire drive system, thereby enabling system operation within a permissible temperature range.
2. A bevel gear drive apparatus including:
   (a) a housing,
   (b) a driven shaft and a drive shaft mounted in said housing,
   (c) beveled gears operatively mounted on said shafts whereby operation of the drive shaft operates the driven shaft, (d) bearing assemblies rotatably retaining said shafts in the housing with said bearing assembly of the driven shaft being subject to a heavy load and thereby a major heat producing structure, (e) heat transfer means fixed in the housing around said heavily loaded bearing assembly with contacting structure to conduct heat therefrom, said heat transfer means including a member of annular shape of relatively high heat conductivity and having an inner wall with a plurality of radially outwardly extending spaced fins thereon, said heat conducting member having a circumferentially exterior wall portion integral with the fins, said inner and exterior wall portion defining passageways therebetween, said fins being located in said passageways whereby heat from the heavily loaded bearing is conducted from said bearing to the walls and fins of the heat transfer means, (f) a fan mounted to the driven shaft adjacent said heavily loaded bearing and operative in response to rotation of said shaft to move air through the passageways to dissipate the heat from the heat transfer means, (g) and means for lubricating said bearing assemblies.

3. The apparatus of claim 2, wherein the heat transfer means includes a carrier for said bearing assembly in contact with said assembly and said member of relatively high heat conductivity to absorb heat from said heavily loaded bearing assembly and conduct it to the fins and portions defining the air passageways.

4. A bevel gear drive apparatus including:
(a) a housing,
(b) a driven shaft and a drive shaft mounted in said housing,
(c) bevel gear means in the housing for rotating the driven shaft in response to rotation of the drive shaft,
(d) a bearing assembly for rotatably retaining the driven shaft in the housing, said bearing assembly carrying a heavy load and thereby being a major heat producing structure in the apparatus,
(e) heat transfer means fixed in a portion of the housing around said heavily loaded bearing assembly for cooling same by conduction of heat therefrom, said heat transfer means including a heat conducting member of annular shape having a plurality of radially outwardly extending fins in spaced relation about the heat conducting member and having a circumferentially exterior wall portion integral with the fins, said heat conduction member also including an inner wall defining passageways between said heat conducting member and said exterior wall portion, said fins being in said passageways whereby heat from the heavily loaded bearing is conducted from said heavily loaded bearing to the walls and fins of the heat transfer means,
(f) a fan mounted on said driven shaft adjacent said heavily loaded bearing and operative in response to rotation of said shaft to move air through the passageways to dissipate the heat from the heat transfer means,
(g) and means for lubricating said heavily loaded bearing assembly.

5. A bevel gear drive apparatus including:
(a) a housing,
(b) a driven shaft extending from the housing,
(c) a thrust bearing assembly rotatably retaining said driven shaft, said thrust bearing assembly being subject to a heavy load and thereby a major heat producing structure,
(d) heat exchanger means on said housing defining air flow passageways through said housing, said passageways having exteriorly communicating end portions, said heat exchanger means including means for providing a heat conduction path to said air flow passageways from said thrust bearing assembly,
(e) fan means operatively mounted on said driven shaft adjacent said heavily loaded bearing having air movement means in communication with said air flow passageways to continuously move air through said heat exchanger means and over said heat conduction path, said driven shaft being rotatably retained within said housing by said thrust bearing assembly,
(f) said apparatus including a drive shaft, a plurality of bearing assemblies, said bearing assemblies rotatably retaining said drive shaft within said housing, said drive shaft being operatively connected to said driven shaft by means of a pair of bevel gears,
(g) a lubricating fluid circulation system, said circulation system including means for circulating said fluid within said housing over the bearing assemblies of said drive shaft and the thrust bearing assembly of said driven shaft, such that heat transfer from the bearing assembly of said drive shaft may be, in turn, transferred to the heat conduction means in contact with the bearing assembly of the driven shaft to effectively remove heat from the entire unit, thereby enabling system operation within a permissible temperature range.

References Cited

UNITED STATES PATENTS

| 3,075,690 | 1/1963 | Luenberger | 308—77 X |
| 2,548,805 | 4/1951 | Moir et al. | 74—606 |
| 2,481,914 | 9/1949 | Eastman et al. | 74—606 |
| 2,327,962 | 8/1943 | Drake | 74—606 X |
| 1,564,742 | 12/1925 | Acker | 165—47 X |
| 2,352,206 | 6/1944 | Kendall | 165—47 X |
| 2,454,371 | 11/1948 | Berges | 165—47 X |
| 2,456,073 | 12/1948 | Newhouse | 165—47 X |
| 2,511,479 | 6/1950 | Olah | 165—185 X |
| 2,594,931 | 4/1952 | Jaeschke | 165—47 X |
| 2,678,013 | 5/1954 | Wallenberg et al. | 165—47 X |
| 3,285,328 | 11/1966 | Woodward | 165—47 |

ROBERT A. O'LEARY, *Primary Examiner.*

ALBERT W. DAVIS, JR., *Assistant Examiner.*

U.S. Cl. X.R.

308—77; 165—122, 47